United States Patent Office 2,782,648
Patented Feb. 26, 1957

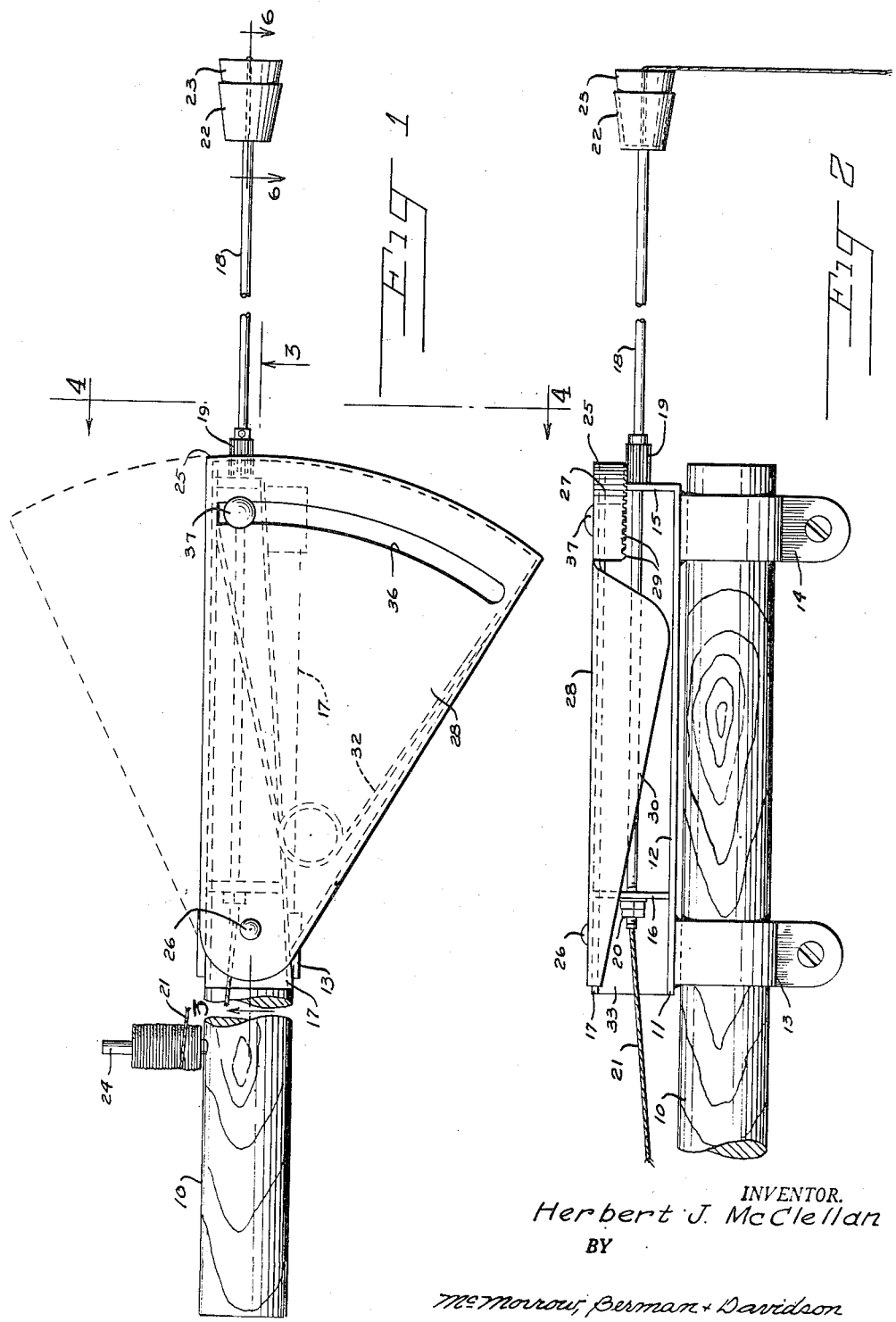

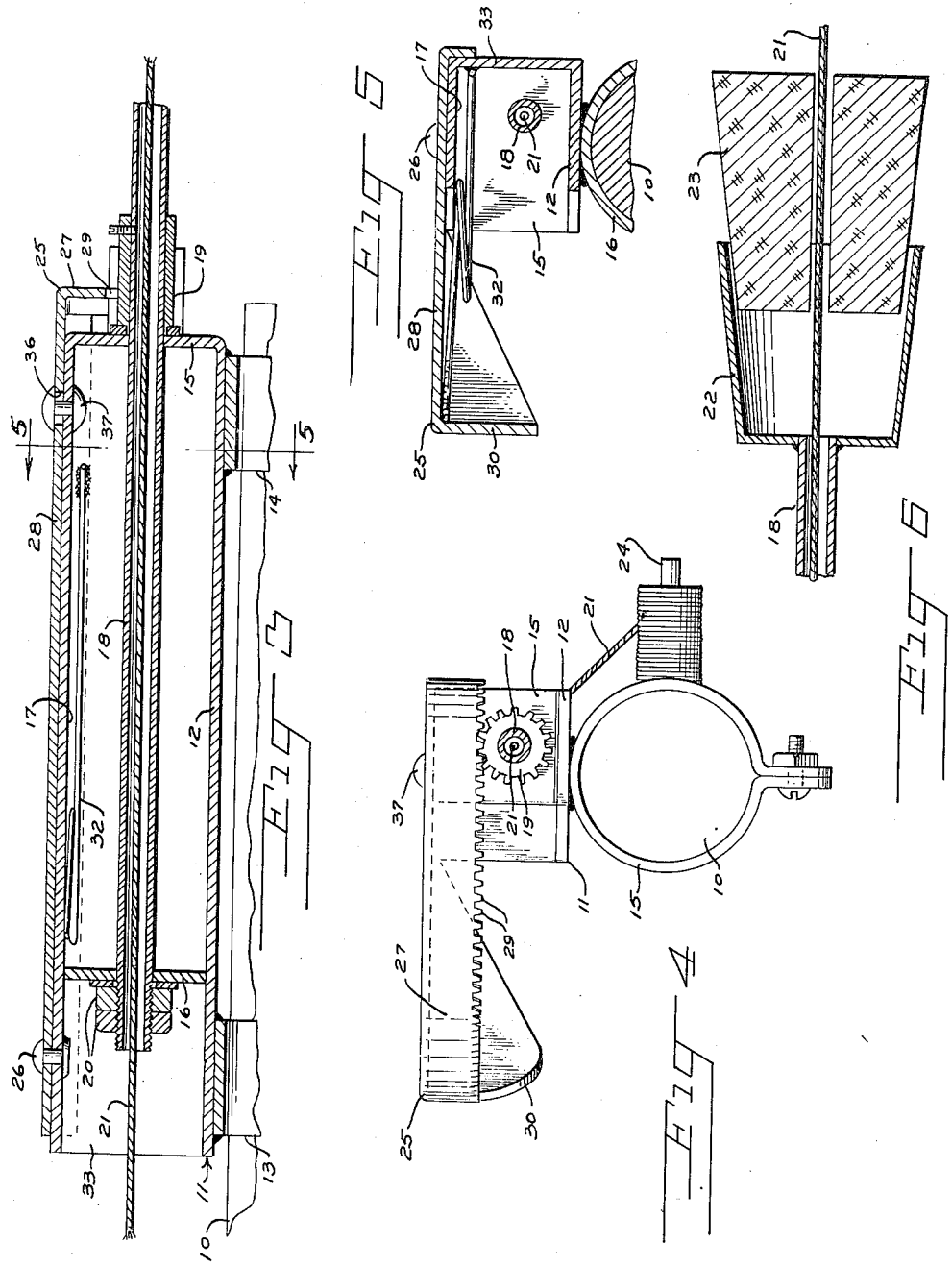

2,782,648

RACK AND PINION GEARING

Herbert J. McClellan, Chippewa Falls, Wis.

Application April 3, 1953, Serial No. 346,701

2 Claims. (Cl. 74—90)

This invention relates to apparatus for fishing and more particularly to apparatus for hand fishing through ice.

It is among the objects of the invention to provide apparatus for hand fishing which is effective to impart a spinning or twirling movement to the bait and associated sinker to attract fish, particularly when fishing through ice; which imparts a twirling movement to the bait and sinker by alternately twisting the associated fishing line in opposite directions; which includes a handle or stock and means mounted on the stock and responsive to resiliently resisted manual pressure to twist the fishing line first in one direction and then in the other; which includes means for holding a fishing line and adjusting the length of the line depending from the stock; which is effective to twist the line without snarling, breaking or abrading the line; and which is simple and durable in construction, economical to manufacture, and easy and convenient to use.

Other objects and advantages will become apparent from a consideration of the following description and the appended claims in conjunction with the accompanying drawings wherein:

Figure 1 is a top plan view of fishing apparatus illustrative of the invention;

Figure 2 is a side elevational view of the apparatus illustrated in Figure 1;

Figure 3 is a longitudinal cross sectional view on the line 3—3 of Figure 1;

Figure 4 is a cross sectional view on the line 4—4 of Figure 1;

Figure 5 is a cross sectional view on the line 5—5 of Figure 3; and

Figure 6 is a fragmentary cross sectional view on an enlarged scale on the line 6—6 of Figure 1.

With continued reference to the drawings, the device or apparatus comprises a handle or stock 10 of cylindrical shape and formed of a suitable material, such as wood, and of a size to be conveniently held in the hand while fishing. A bracket 11 is mounted on the stock 10 at one end of the stock and comprises a base plate 12 of elongated, rectangular shape extending longitudinally of the stock, clamp bands 13 and 14 secured to the plate, one at each end thereof, and embracingly engaging the stock 10 at locations spaced apart therealong to firmly secure the bracket on the stock, an apertured ear 15 upstanding perpendicularly from the base plate 12 at one end of the base plate, a second apertured ear 16 upstanding perpendicularly from the base plate at a location spaced from the other end of the base plate and an outer plate 17 secured to the ends of the ears 15 and 16 remote from the base plate and disposed in spaced and parallel relationship to the base plate and coterminous therewith.

A side or cover plate 33 is secured to the edges of the plates 12 and 17 and the ears 15 and 16 at one side of the bracket substantially coextensive with the plates 12 and 17 to close this side of the bracket for a purpose to be later described.

An elongated tubular rod 18 extends through the apertures in the bracket ears 15 and 16 and is journaled in the bracket in spaced and substantially parallel relationship to the stock 10. This rod terminates at one end between the ear 16 and the adjacent end of the bracket base plate 12, and extends at its other end outwardly of the ear 15 and the adjacent end of the stock 10 to provide a fishing rod of desired length.

A pinion gear 19 is secured on the rod 18 at the outer surface of the ear 15, and abutment nuts 20 are threaded onto the rod at the outer surface of the ear 16, suitable thrust washers being preferably interposed between the nuts 20 and the ear 16 and the gear 19 and the ear 15. The pinion gear 19 and the nuts 20 hold the rod against longitudinal movement relative to the bracket 11, and a fishing line 21 extends longitudinally through the rod and depends from the end of the rod spaced outwardly from the ear 15 of the bracket.

An inwardly tapered cup 22 is mounted on the end of the rod 18 disposed outwardly of the bracket ear 15 and is disposed coaxially of the rod, and a split, tapered cork 23 is received in the cup 22. The fishing line 21 extends through the split in the cork 23 and when the cork is forced into the tapered cup 22 it clamps the line to the cup and thereby secures the line in selected positions of longitudinal adjustment relative to the rod 18.

A stem 24 projects perpendicularly from the stock 10 at a location spaced along the stock from the end of the bracket adjacent the ear 16 and the unused portion of the fishing line 21 is wound on this stem or pin to carry the line on the stock or handle of the apparatus.

A hand lever 25, in the form of a flat, sector shaped plate, is disposed on the outer plate 17 of the bracket in spaced and substantially parallel relationship to the bracket base plate 12 and is pivotally connected at its apical end to the plate 17 near the bracket ear 16, by a pivot pin or rivet 26. The lever 25 is provided at its wider end with an arcuately curved flange 27 extending perpendicularly from the plate portion 28 of the lever with the center of its curvature at the axis of the pivotal connection provided by the pivot pin 26 and inwardly of the flange 27 with a transversely extending curved slot 36. The flange 27 has on its edge remote from the plate portion 28, gear teeth 29 which mesh with the teeth of the pinion gear 19 on the rod 18 and rotate the rod as the hand lever 25 is swung about its pivotal connection with the bracket 11.

A flange 30 projects from one side edge of the plate portion 28 of the sector shaped hand lever in the same direction as the flange 27 projects from the plate portion, and the flange 30 is tapered in width from the wider and toward the narrower end of the sector shaped lever and is curved to comfortably fit the hand or thumb of a person using the device. A hairpin shaped spring 32 is disposed at the under side of the lever 25 and has divergent legs, one of which bears at its distal end against the inner side of the flange 30 near the wider end of the lever, and the other of which bears at its distal end against the inner side of the bracket side plate 33.

A rivet 37 is secured in the bracket plate 17 and extends through the slot 36 in the hand lever 25, having a head at the outer side of the hand lever to hold the wider end of the hand lever down on the bracket and maintain the gear teeth 29 in mesh with the teeth of the pinion gear 19.

The hand lever 25 can be swung in one direction about the pivot pin 26 by manual pressure on the flange 30 of the hand lever and, when so moved against the force of spring 32, will turn the pinion gear 19 and the rod 18 in one direction, twisting the depending portion of the fishing line 21. When the manual pressure on the hand lever 25 is released, the spring 32 will move the hand lever in the opposite direction, turning the pinion gear 19 and rod 18 in the opposite direction, and oppositely twisting the depending portion of the fishing line. This will impart twirling movements in successively opposite directions to the bait and sinker carried by the end of the depending portion of the fishing line to attract fish to the bait. By properly timing the movements of the hand lever 25 the oppositely twirling movements of the bait and sinker can be built up to a periodic or cyclic action in which the bait and sinker will turn in one direction for a predetermined time, winding up the depending portion of the line a predetermined extent, and will then reverse its direction of rotation and turn in the other direction for an equal length of time.

The side or cover plate 33 prevents the fingers of a hand holding the stock 10 and operating the lever 25 from entering the space within the bracket and interfering with the rotation of the tubular rod 18.

The invention may be embodied in other specific forms without departing from the spirit or essential characteristics thereof. The present embodiment is, therefore, to be considered in all respects as illustrative nad not restrictive, the scope of the invention being indicated by the appended claims rather than by the foregoing description, and all changes which come within the meaning and range of equivalency of the claims are, therefore, intended to be embraced therein.

What is claimed is:

1. Fishing apparatus comprising a stock, a bracket mounted on said stock, a tubular rod journaled in said bracket to receive a fishing line extending longitudinally therethrough, a hand lever pivotally mounted on said bracket and movable in one direction relative to said rod by manual pressure thereon, spring means disposed between said bracket and said hand lever resiliently urging said hand lever in the opposite direction, and means disposed externally of said bracket drivingly connecting said hand lever to said rod for rotating said rod in successively opposite directions as said lever is alternatively moved by manual pressure thereon and by said spring means, said means connecting said hand lever to said rod comprising a plate having one end pivotally connected to said bracket and having teeth on the other end, and a pinion gear disposed on said rod externally of said one end of said bracket and in mesh with the teeth on said plate.

2. Fishing apparatus comprising a stock, a bracket mounted on said stock, a tubular rod journaled in said bracket to receive a fishing line extending longitudinally therethrough, a hand lever pivotally mounted on said bracket and movable in one direction relative to said rod by manual pressure thereon, spring means disposed between said bracket and said hand lever resiliently urging said hand lever in the opposite direction, and means drivingly connecting said hand lever to said rod for rotating said rod in successively opposite directions as said lever is alternatively moved by manual pressure thereon and by said spring means, said hand lever comprising a sector shaped plate pivotally connected at its apical end to said bracket and having at its other end a longitudinally curved toothed flange disposed externally of said bracket at one end thereof, and a pinion gear on said rod disposed externally of said one end of the bracket in mesh with the teeth of said flange for rotation of said rod upon swinging movements of said hand lever about its pivotal connection with said bracket.

References Cited in the file of this patent

UNITED STATES PATENTS

| | | |
|---|---|---|
| 227,378 | Morse | May 11, 1880 |
| 387,185 | Rudasill | July 31, 1880 |
| 1,113,812 | Mestel | Oct. 13, 1914 |
| 1,224,740 | Green | May 1, 1917 |
| 2,041,200 | Myers | May 15, 1936 |
| 2,169,698 | Lancaster | Aug. 15, 1939 |
| 2,591,338 | Cooper | Apr. 1, 1952 |